United States Patent [19]

Duchek

[11] 4,141,496

[45] Feb. 27, 1979

[54] PNEUMATIC THERMOSTAT

[75] Inventor: Ernest J. Duchek, Mt. Prospect, Ill.

[73] Assignee: Powers Regulator Co., Skokie, Ill.

[21] Appl. No.: 767,679

[22] Filed: Feb. 11, 1977

Related U.S. Application Data

[60] Division of Ser. No. 566,387, Apr. 9, 1975, Pat. No. 4,007,873, which is a continuation-in-part of Ser. No. 472,337, May 22, 1974, abandoned.

[51] Int. Cl.[2] ............................................. F24F 11/02
[52] U.S. Cl. ................................... 236/49; 236/DIG. 19
[58] Field of Search ................... 236/49, 87, 86, 80 R, 236/DIG. 19

[56] References Cited

U.S. PATENT DOCUMENTS

| | | | |
|---|---|---|---|
| 3,238,338 | 3/1966 | Nelson | 236/DIG. 19 |
| 3,779,275 | 12/1973 | Ley et al. | 236/49 X |
| 3,913,832 | 10/1975 | Dean, Jr. | 236/49 |

Primary Examiner—William E. Wayner
Attorney, Agent, or Firm—James B. Blanchard

[57] ABSTRACT

An improved pneumatic thermostat is provided which is capable of generating from a variable pressure air supply a pressurized air signal indicative of ambient temperature. The thermostat is used in conjunction with an air flow regulator in an air distribution system and utilizes as an air supply a portion of the air flow being distributed. The thermostat utilizes a pressure reducing valve which is referenced to pressure downstream from the air flow regulator, a flapper and nozzle pneumatic mechanism activated by a bi-metallic lever, and a self-aspirating arrangement which insures the bi-metallic lever is continuously sensing the true ambient temperature.

14 Claims, 12 Drawing Figures

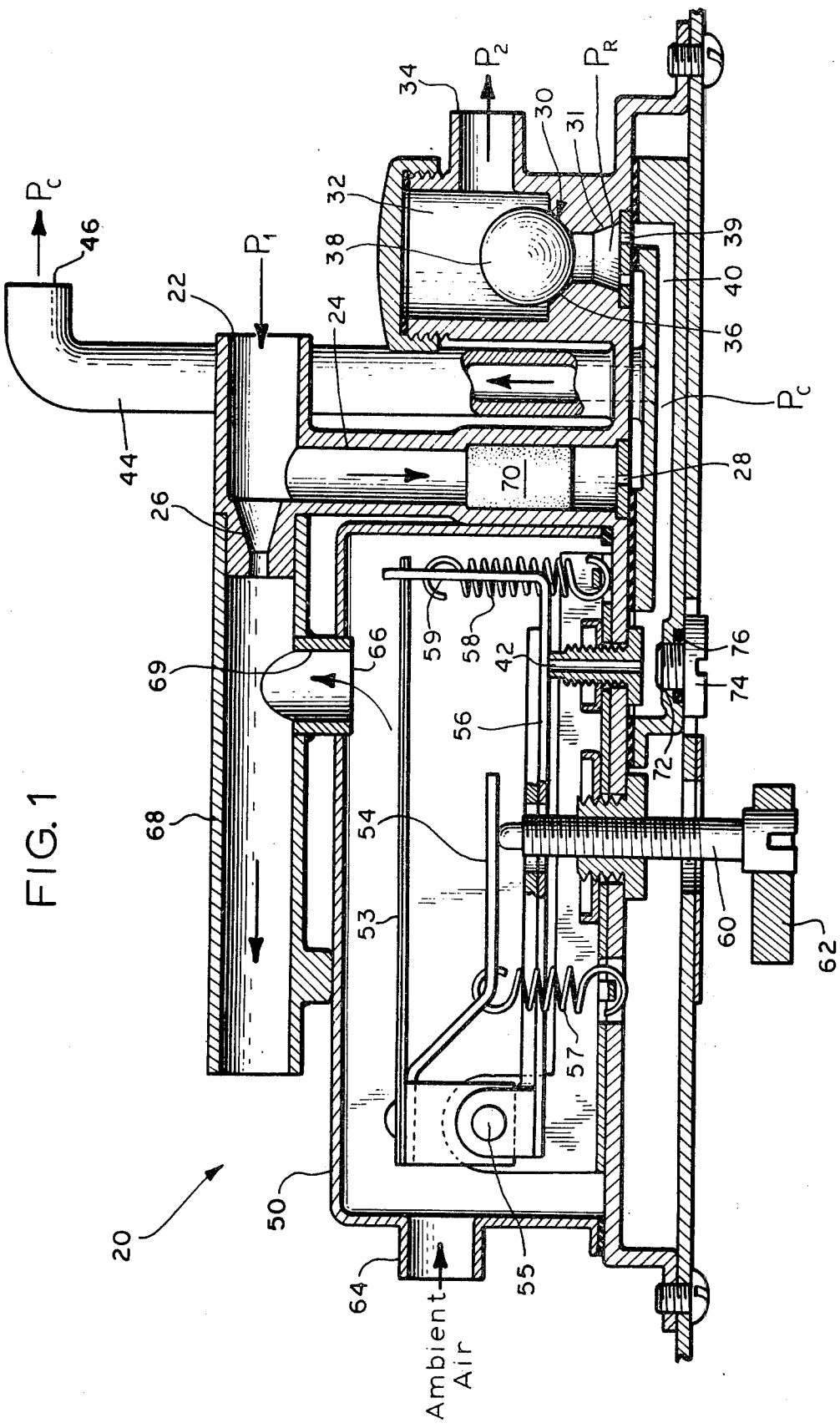

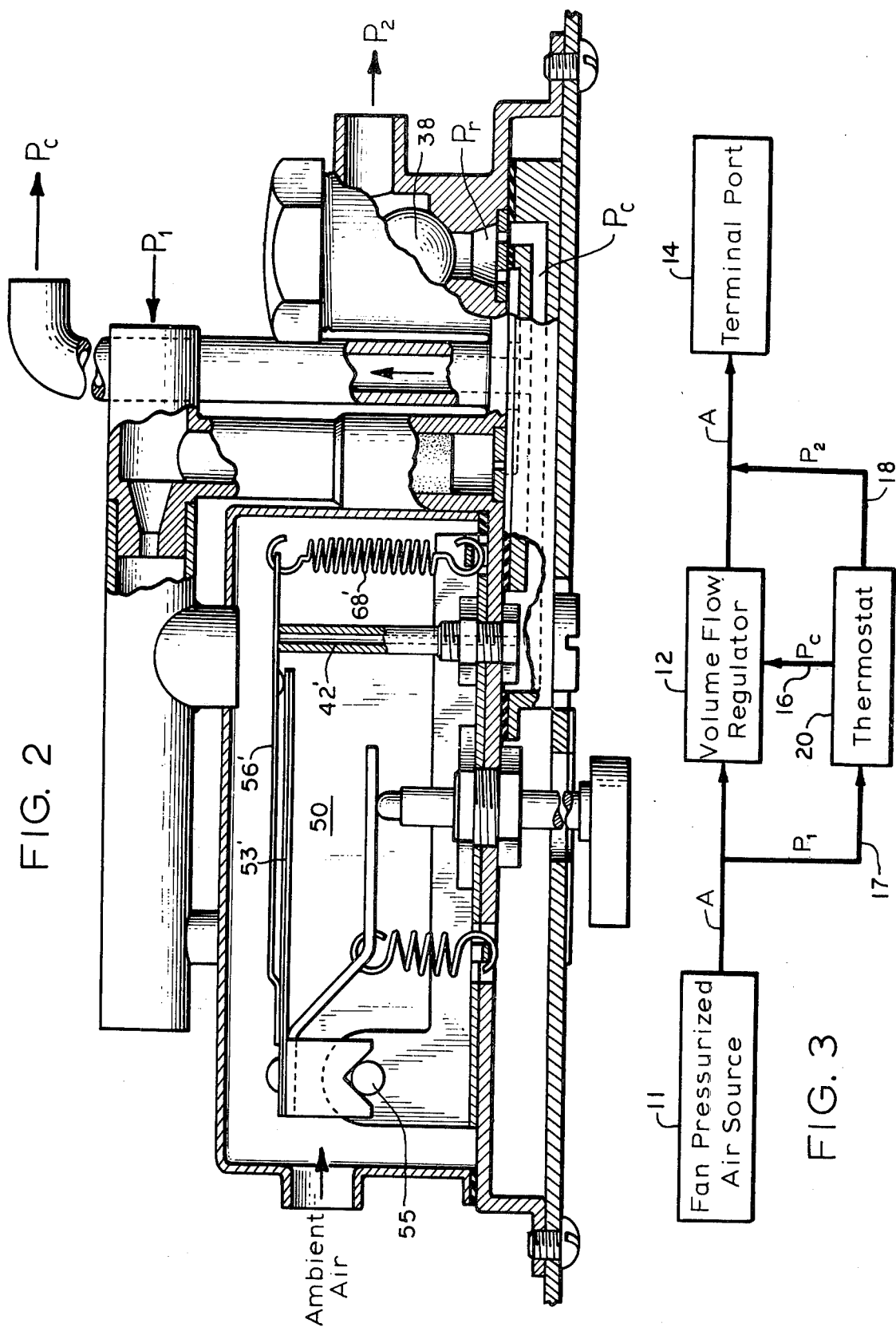

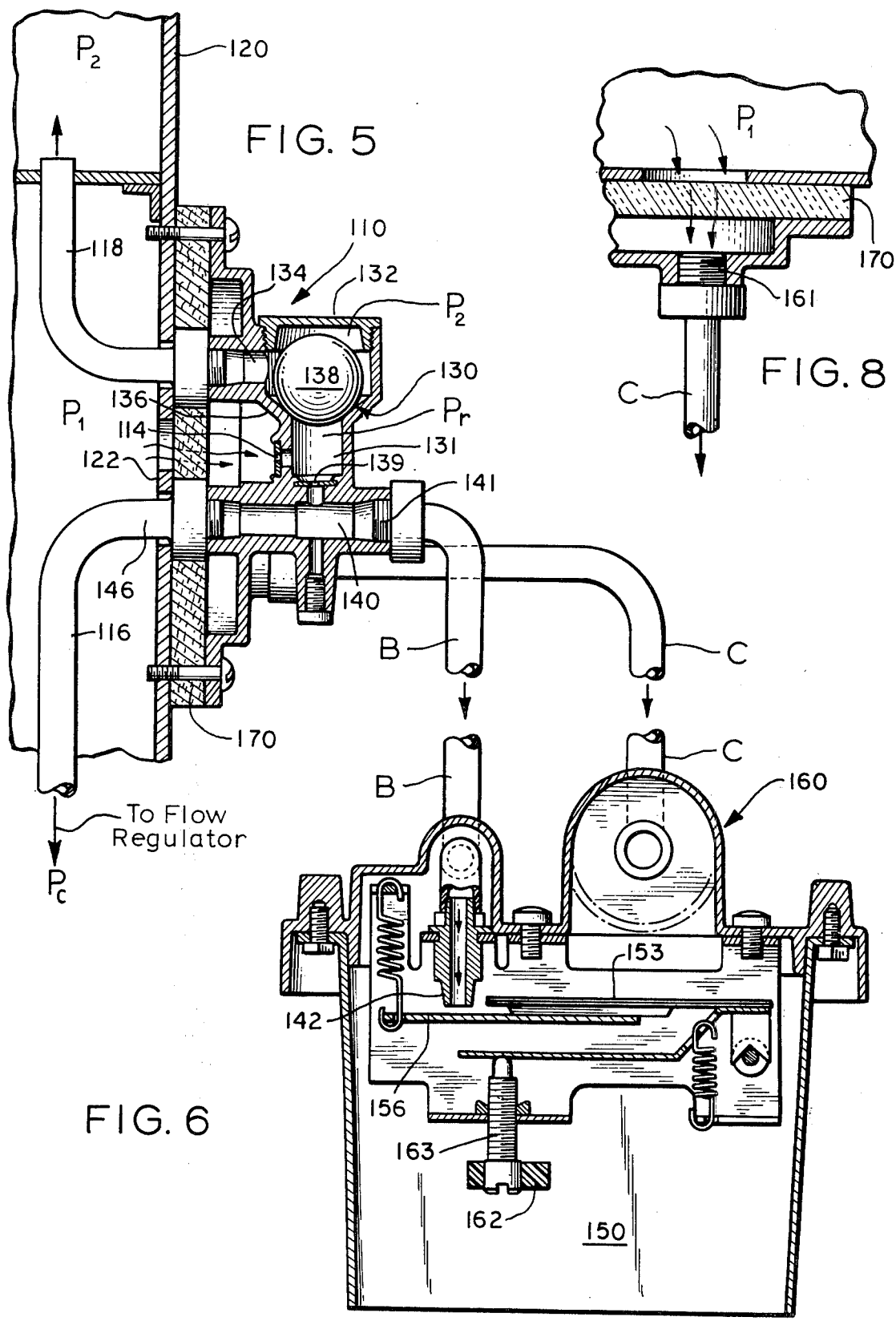

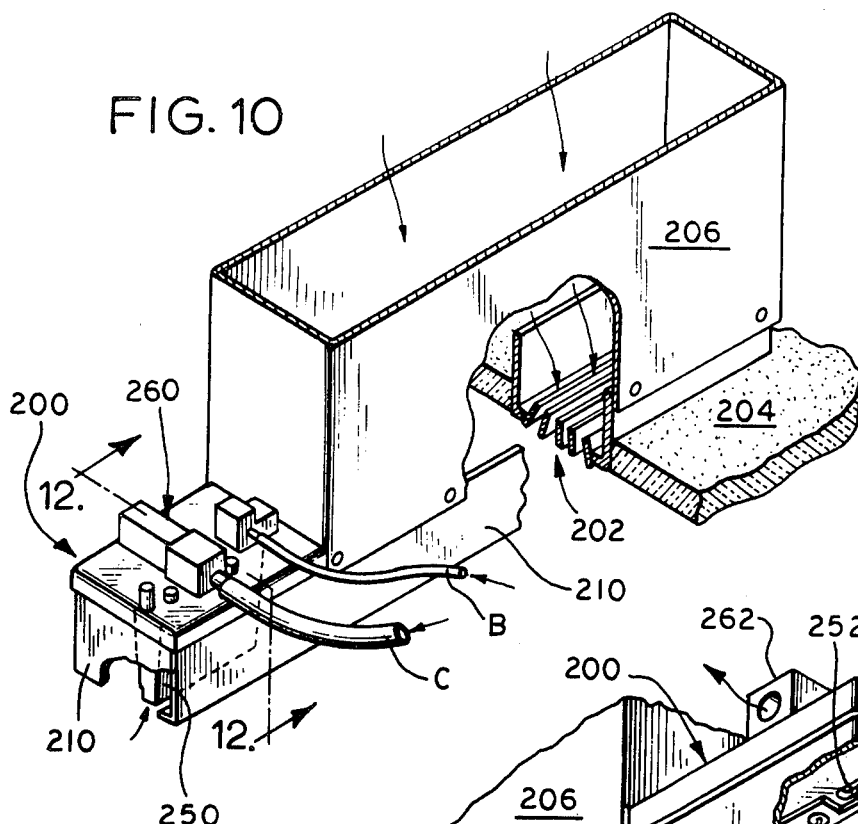
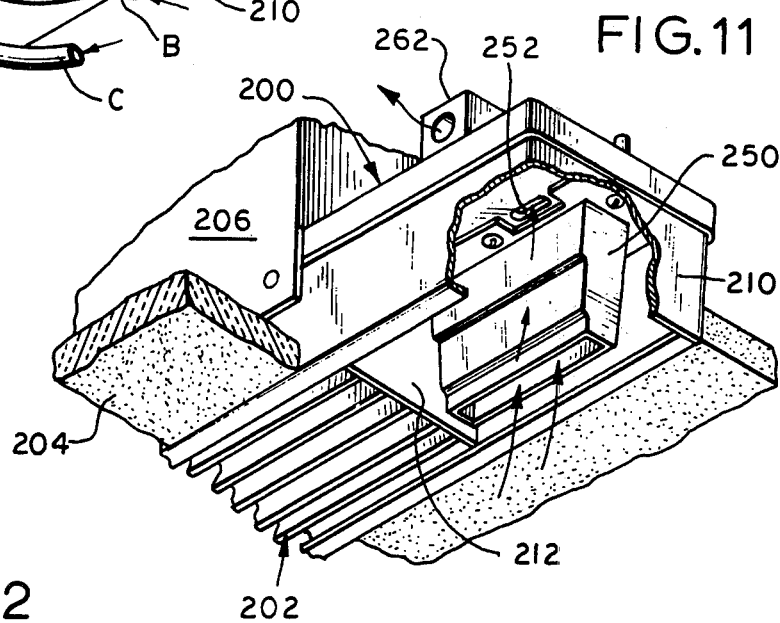
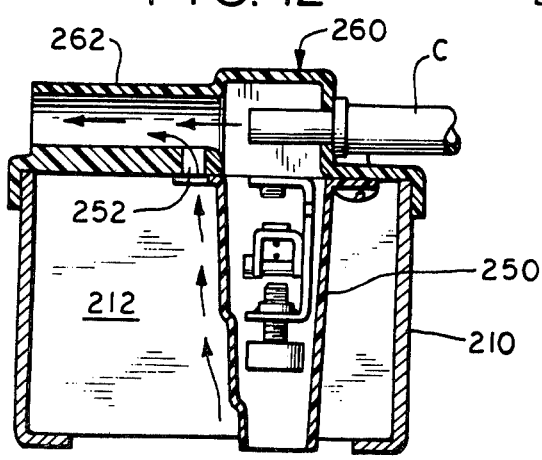

PNEUMATIC THERMOSTAT

This is a divisional of a co-pending application Ser. No. 566,387 filed Apr. 9, 1975 now U.S. Pat. No. 4,007,873, issued 2/15/77 which in turn is a continuation-in-part of an application Ser. No. 472,337 filed May 22, 1974, now abandoned.

BACKGROUND OF THE INVENTION

The present invention relates generally to apparatus responsive to temperature and, more specifically, to an improved pneumatic thermostat to be used in conjunction with air flow distribution systems.

Systems for automatically controlling the environmental temperature in habitable, enclosed areas generally employ a fan pressurized air source which supplies air through ducts to the various rooms or portions of the enclosure. In each room one or more terminal ports may be found which typically employ ceiling-mounted diffusers in order to direct the discharged air horizontally along the ceiling. If pressure increases in the duct system causing the flow through the diffusers to become excessively high objectionable velocity noise may result. On the other hand, if the flow becomes excessively low, the air does not move horizontally along the ceiling when discharged from the diffuser, but rather drops directly down causing what is known as cold air dumping. Such a phenomena may result in objectionable, cold downdrafts on the occupants of the room.

Therefore, in order to provide an air distribution apparatus which maintains the air flow between some acceptable maximum and minimum values, air flow regulators are employed which automatically regulate the volume flow of air from the air supply means to the terminal diffuser ports. Such regulators in order to provide maximum efficiency and optimum service must be responsive not only to pressure differentials within the air distribution apparatus itself, but they must also be responsive to changes in the ambient temperature within the enclosed area. Accordingly, air flow distribution systems typically employ a thermostat disposed within the enclosed area which generates a signal in response to the ambient temperature therein. This signal is transmitted to the volume flow regulator which adjusts the air flow to the terminal port in response thereto. Thus, the air distribution system is self-adjusting so as to maintain the temperature within the enclosure within acceptable limits.

Pneumatic thermostats have been suggested for use in such air distribution systems. These temperature responsive devices generate from a substantially constant pressure air supply a pressurized air signal indicative of ambient temperature. When the system employs a more sophisticated volume flow regulator, it is sometimes desirable that the thermostat be able to reference its output signal not only to temperature but also to the pressure in the system downstream from the regulator. An air distribution apparatus requiring such a thermostat is described in U.S. Pat. application Ser. No. 416,202, now abandoned. However, in order to reference the ouput signal of the thermostat totally to the pressure downstream of the regulator, it is required that the thermometric element be sealed from the ambient air. This, in turn, makes accurate sensing of the ambient temperature more difficult.

Moreover, in order to generate a pressurized air signal which is indicative of ambient temperature the pneumatic thermostat must be provided with a substantially constant pressure air supply. Prior art devices typically employ a central air supply which feeds all the pneumatic thermostats of the air distribution system. Such an arrangement is not only costly, but it also renders the operation of the individual flow regulators dependent upon the central air supply to its thermostat. Thus, the individual air flow regulators are not completely independent.

Therefore, according to the present invention, there is provided a pneumatic thermostat for use in conjunction with an air distribution system which is capable of generating a pressurized air signal referenced not only to ambient temperature but also to the pressure in the distribution system downstream from the air flow regulator. Moreover, the pneumatic thermostat of the present invention uses as its air supply source the air flow within the air distribution system itself. Thus, the need for a central air supply for each individual thermostat is completely eliminated.

SUMMARY OF THE INVENTION

The present invention is directed toward an improved pneumatic thermostat which is capable of reducing a variable pressure air supply to a substantially constant pressure air flow and generating from this constant pressure air flow an air pressure signal which is indicative of the ambient temperature.

The improved thermostat is comprised, generally, of means for receiving a variable pressure air supply; means for generating from the air supply a substantially constant pressure air flow; a chamber having inlet means for receiving said air flow, temperature responsive means for adjusting the pressure within the chamber in response to changes in ambient temperature; outlet means communicating with said chamber for transmitting a pressure signal indicative of said temperature; and, means for aspirating ambient air by and through said temperature responsive means.

Thus, the improved thermostat may be comprised of a pressure reducing chamber, a thermometric chamber containing a temperature sensing device, and an aspirator. More specifically, means for receiving the variable pressure air supply communicates with a means for separating the air suply into two portions. The pressure reducing chamber includes a lower section adapted to receive the first portion of the air supply, an upper section in communication with an air outlet port, and means for intermittently bleeding the lower section to the upper section in order to maintain a constant pressure within the lower section. The lower section is also provided with a restriction nozzle which is adapted to continuously bleed from this lower section to the pressure transmitting chamber a substantially constant pressure air flow. The pressure transmitting chamber has an exhaust nozzle which vents to the thermometric chamber, the thermometric chamber also having an ambient air inlet port and an air outlet port. Within the thermometric chamber there is disposed means for variably inhibiting the air flow from the exhaust nozzle, automatically, in response to changes in ambient temperature, thereby producing a pressure within the pressure transmitting chamber which is indicative of the ambient temperature. A third outlet port is provided which is in communication with the pressure transmitting chamber and is adapted to transmit a pressure signal which is also indicative of ambient temperature. Finally, a means for aspirating the thermometric chamber is positioned adjacent to the second air outlet port. This aspirating means is in communication with the air supply receiving means and it is adapted to utilize the second portion of the air supply to aspirate the ambient air through the thermometric chamber.

The improved pneumatric thermostat of the present invention is ideally suited for use in conjunction with an air flow regulator in an air distribution system wherein it is desired to provide a constant volume air flow to the terminal ports of the system. Moreover, the air flow is adjustable in response to both pressure variations within the distribution system itself and the ambient temperature within the enclosed area to be serviced by the system.

BRIEF DESCRIPTION OF THE DRAWINGS

The invention will be better understood by reference to the drawings.

FIG. 1 is a side elevational view of one embodiment of the pneumatic thermostat of the present invention.

FIG. 2 is also a side elevational view showing an alternative embodiment of the pneumatic thermostat of the present invention.

FIG. 3 is a schematic representation of an air distribution system which employs a thermostat of the present invention.

FIG. 5 is a sectional view taken along line 5—5 of FIG. 4 showing in greater detail the pressure reducing and pressure transmitting chambers of the modular embodiment.

FIG. 6 is a sectional view taken along line 6—6 of FIG. 4 showing in greater detail the thermometric chamber and the aspirator of the modular embodiment.

FIG. 8 is a sectional view taken along line 8—8 of FIG. 4.

FIGS. 10 and 11 are perspective views of another alternative embodiment of the pneumatic thermostat of the present invention shown in typical ceiling mounted installation.

FIG. 12 is a sectional view taken along line 12—12 of FIG. 10.

DETAILED DESCRIPTION OF THE INVENTION

Figure 4:
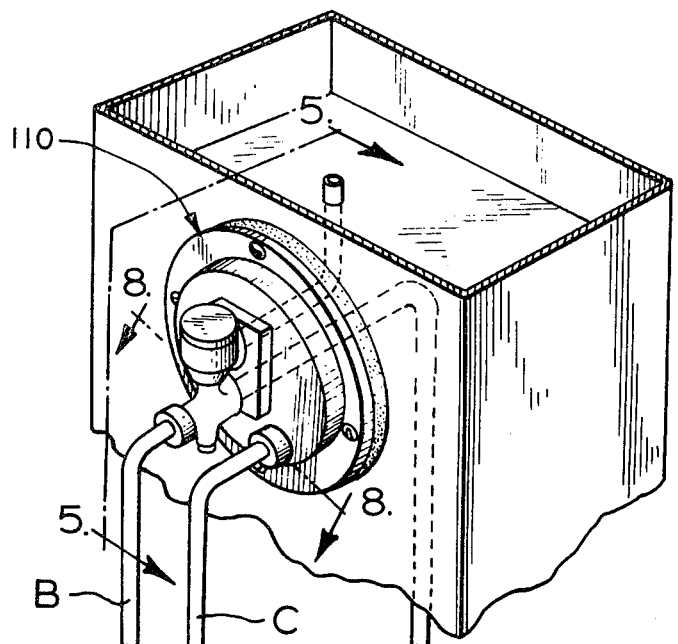
FIG. 4 is a perspective view showing a modular embodiment of the pneumatic thermostat of the present invention.

One embodiment of the improved pneumatic thermostat of the present invention is illustrated in FIG. 1, and it is shown as typically mounted in the ceiling of the enclosure which it services. The thermostat, designated generally as 20 includes means for receiving an air supply at variable pressure $P_1$. The air supply receiving means, as for example air inlet port 22, communicates with conduit 24 and orifice 26 in order to separate the air supply into two portions. A first portion of the air supply passes through conduit 24 and air restriction 28 to the pressure reducing chamber 30. The second portion of the air supply passes through orifice 26. Chamber 30 is comprised of a lower section 31 and an upper section 32 which includes an air outlet port 34. Disposed within chamber 30 and between the lower and upper sections, 31 and 32 respectively, is seat 36 which has an aperture therein defining an air flow passageway. Also disposed within upper section 32 of the pressure reducing chamber 30 is a ball 38 which, by force of gravity, removably engages the seat 36 so as to intermittently close the air flow passageway. Finally, the lower section 31 of chamber 30 includes a restriction nozzle 39 which continuously bleeds a substantially constant air flow to a pressure transmitting chamber 40. Chamber 40, in turn, communicates with an exhaust nozzle 42 which vents chamber 40 into a thermometric chamber 50.

Disposed within the thermometric chamber 50 is a thermometric element, which includes a bi-metallic lever 53 fixedly secured to an adjustment lever 54 both of which are pivotally mounted at pivot 55. A flapper 56 is also mounted on pivot 55, and it is positioned adjacent to the nozzle 42 so as to inhibit the flow of air therefrom. Fixedly secured to the extremity of flapper 56 is a linking member 59 which is adapted to engage bi-metallic lever 53 as the lever moves upwardly in response to a change in ambient temperature. An extension spring 58 may be employed to bias flapper 56 and linking element 59 toward nozzle 42.

Thus, in a manner well known in the art, the bimetallic lever 53 will engage the linking member 59 and, in response to temperature changes, thereby vary the distance separating the nozzle 42 from the flapper 56. This action, in turn, will vary the air discharge from nozzle 42 and in this way the pressure within the pressure transmitting chamber 40 is regulated so as to correspond to, or be indicative of, ambient temperature.

Chamber 40 also communicates with an air outlet conduit 44 and outlet port 46 through which a pressurized air signal $P_c$ may be transmitted. This signal, of course, would also be indicative of ambient temperature.

The thermometric element of the present invention further includes an extension spring 57 which biases adjusting lever 54 against adjusting rod 60. A set point knob 62 is secured to adjusting rod 60 so as to provide a means for setting an initial pressure signal $P_c$ in response to a given temperature.

The thermometric chamber 50 further includes an ambient air inlet port 64 and an outlet port 66. Positioned adjacent to outlet port 66 is conduit 68 and orifice 26. Conduit 68 communicates with outlet port 66 via air flow passageway 69 such that as the second portion of the air supply passes through orifice 26 and into conduit 68, a venturi-like suction is applied to the port 66. Accordingly, ambient air is drawn into chamber 50 via port 64 and out through outlet portion 66 and passageway 69, as is shown by the arrows. In this way ambient air is continually aspirated through the thermometric chamber 50 so that thermometric element adjusts in response to the true ambient temperature.

It may also be desirable to filter the portion of the air supply utilized to generate the pressure signal $P_c$ in order to insure that foreign matter does not accumulate in the various nozzles within the thermostat. Such accumulations could adversely affect the accurate operation of the device. Accordingly, a filtering element 70 may be employed and positioned within conduit 24 so as to remove dirt particles from the air supply. The filter may be composed of felt, plastic, cellulose, or other suitable materials. However, it should be sufficiently porous so as to avoid any significant reduction in the pressure $P_1$ which might adversely affect the pressure stabilization produced in the lower section 31 of chamber 30.

A threaded port 72 may be provided in the wall of the pressure transmitting chamber 40 through which a tap could be made to determine $P_c$ for servicing and adjustment. Of course, the port is sealably closed by tap screw 74 and o-ring 76 when the device is in operation.

Another embodiment of the improved thermostat of the present invention, making use of an alternative bi-metallic lever and flapper arrangement, is illustrated in FIG. 2. In this embodiment a flapper 56' is fixedly secured to the bi-metallic lever 53' adjacent to pivot 55, at a base portion of the lever which is immobile in response to changing temperature. Flapper 56' extends beyond the free end of bi-metallic lever 53', as is shown in FIG. 2, and is positioned adjacent to the exhaust nozzle 42' so as to inhibit the flow of air therefrom. A spring 68' may also be employed so as to bias flapper 56' toward nozzle 42'.

The operation of this embodiment is identical to that of the arrangement shown in FIG. 1, such that a pressure signal $P_c$ is generated and transmitted from outlet port 46 which is indicative of the ambient temperature as sensed in chamber 50.

The improved thermostat of the present invention as illustrated in the embodiments set forth above operates suitably in conjunction with a pneumatic-activated air flow regulator in an air distribution system, such as is shown schematically in FIG. 3. An airflow A, provided by a pressurized air source 11, flows through an air flow regulator 12 to the terminal port diffuser 14 from which it is discharged into the enclosure serviced by the system. In order that the regulator 12 be responsive to changes in ambient temperature, it is adapted to adjust to a pressurized air signal $P_c$ generated by the thermostat 20 and conveyed to the regulator via conduit 16.

So as to make the regulator 12 and thermostat 20 independent of any external energy source, the thermostat 20 utilizes as its air supply a portion of the air flow A taken from the system upstream of the regulator 12. This air supply, at a variable pressure $P_1$, is conveyed to the air inlet port 22 of the thermostat 20 via conduit 17. In order to generate a pressure signal indicative of ambient temperature this air supply at pressure $P_1$, which may vary in magnitude through a range of 5:1 or more, must be reduced to a substantially constant pressure air flow. Thus, a portion of the air supply flows through the filter 70 and into the flow section 31 of the pressure reducing chamber 30 which is separated from upper section 32 by the ball 38 resting in the seat 36. Of course, the resulting reduced pressure $P_r$ which will be maintained in the lower section 31 will be dependent upon the weight of the ball 38, the pressure $P_2$ in the upper section 32 and the size of the continuous bleed air restriction 39. The ball 38 is of such a weight that its downward force equals the area of the aperture in seat 36 multiplied by the desired reduced pressure $P_r$ which drives the air flow through the restriction 39 and into the pressure transmitting chamber 40.

As has been noted above, it is sometimes desirable that the pressure signal $P_c$ generated by the thermostat 20 will be at least partially referenced to the pressure within the air distribution system downstream of the regulator. Accordingly, the outlet port 34 of upper section 32 communicates with air flow A downstream of regulator 12 via conduit 18. This arrangement insures that the air flow through the pressure reducing chamber 30 will always be from the lower section 31 to the upper section 32, since $P_1$ must always be greater than $P_2$.

Therefore, air at pressure $P_1$ flows into lower section 31 until the pressure is slightly above $P_r + P_2$. At this point the ball 38 will lift from the seat 36 and air will bleed from section 31 to section 32 until the pressure in section 31 is slightly below $P_r + P_2$. At this point the ball 38 will again engage seat 36 and the air flow passageway will be closed. Thus, this arrangement will intermittently bleed lower section 31 so as to provide a substantially constant reduced pressure $P_r$, referenced to $P_2$, for a wide variation in air supply pressure $P_1$.

In this manner, a constant pressure is supplied to the pressure transmitting chamber 40 via restriction nozzle 39. This chamber, in turn, vents to the thermometric chamber 50 via exhaust nozzle 42, and the air discharge from nozzle 42 is regulated by the position of flapper 56 and bi-metallic lever 53. Thus, the resulting pressure $P_c$ within the pressure transmitting chamber 40 will be indicative of ambient temperature and the given initial set point made with adjusting rod 60 and set point knob 62. This pressure may be transmitted via conduit 44 and outlet port 46 to conduit 16 and the regulator 12.

A further embodiment of the present invention is illustrated in FIGS. 4 to 9. In this embodiment modular components are utilized with the pressure reducing and pressure transmitting chambers physically separated from the thermometric chamber and the aspirator. As can be seen in FIGS. 4 and 5, the pressure reducing and pressure transmitting chambers, 130 and 140 respectively, are combined into a single unit, designated generally as 110, which is preferably mounted on a wall 120 of the duct work of the air distribution system. The unit 110 is mounted over a porous, low pressure drop filter 170 which also serves, at its compressed perimeter, as a gasket to prevent air flow leakage from the system. Air at a pressure $P_1$ flows through the filter 170 and air restriction 114 into the lower section 131 of the pressure reducing chamber 130. The lower section 131, like the previous embodiments described hereinabove, bleeds intermittently into the upper chamber 132 via a ball and seat arrangement. Upper section 132 also communicates via outlet port 134 and a conduit 118 with the air distribution system downstream from the regulator at a pressure $P_2$. Thus, a reduced pressure $P_r$ is maintained substantially constant within section 131, which pressure drives the air through air restriction 139 and into the pressure transmitting chamber 140.

The thermometric chamber 150 along with the means 160 for aspirating this chamber are, in this embodiment, separated from the unit 110 and mounted at a remote location within the enclosure serviced by the air volume regulator.

The air nozzle 142 is provided an air supply via conduit B which communicates with the outlet 141 for the pressure transmitting chamber 140. Of course, the pressure within chamber 140 will be regulated so as to correspond to ambient temperature in the same manner as is described for the embodiments described above. Accordingly, a pressure signal $P_c$ indicative of ambient temperature will be transmitted via outlet 146 and conduit 116 directly to the volume flow regulator.

Figure 7:
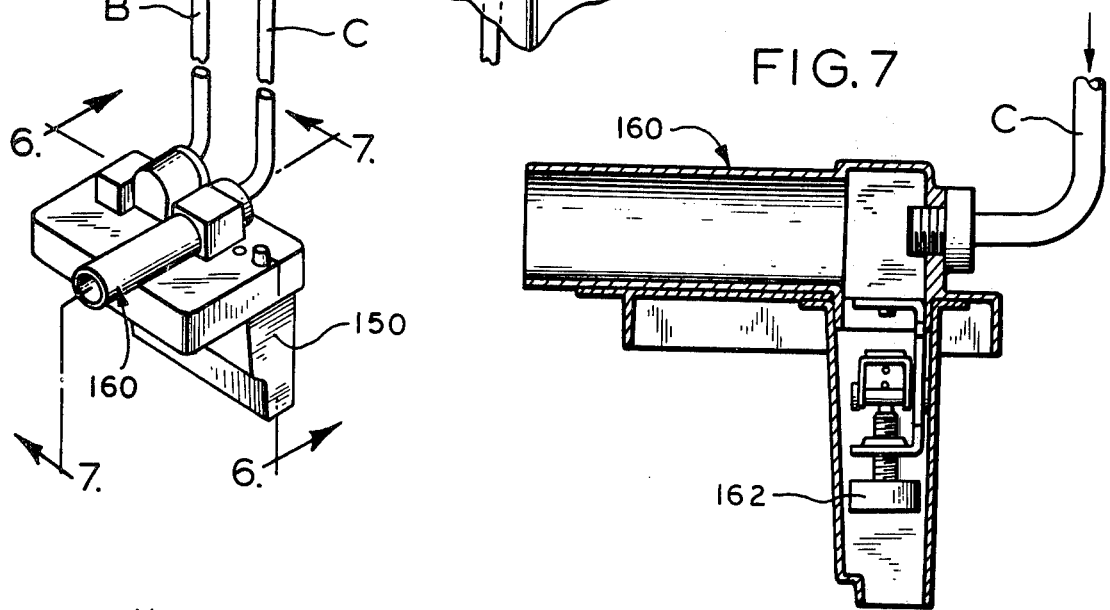
FIG. 7 is a sectional view taken along line 7—7 of FIG. 4.

The aspirating means 160, as is shown in FIGS. 4 and 7, is provided an air supply via conduit C which communicates with the air distribution system, as is shown in FIG. 8, through the port 161 in the unit 110. Thus, the air supplied to the aspirator is filtered by filtering means 170 and no individual filtering element need be provided.

It will be apparent that the operation of the modular thermostat described above is substantially the same as that of the integrated embodiments previously discussed.

Figure 9:
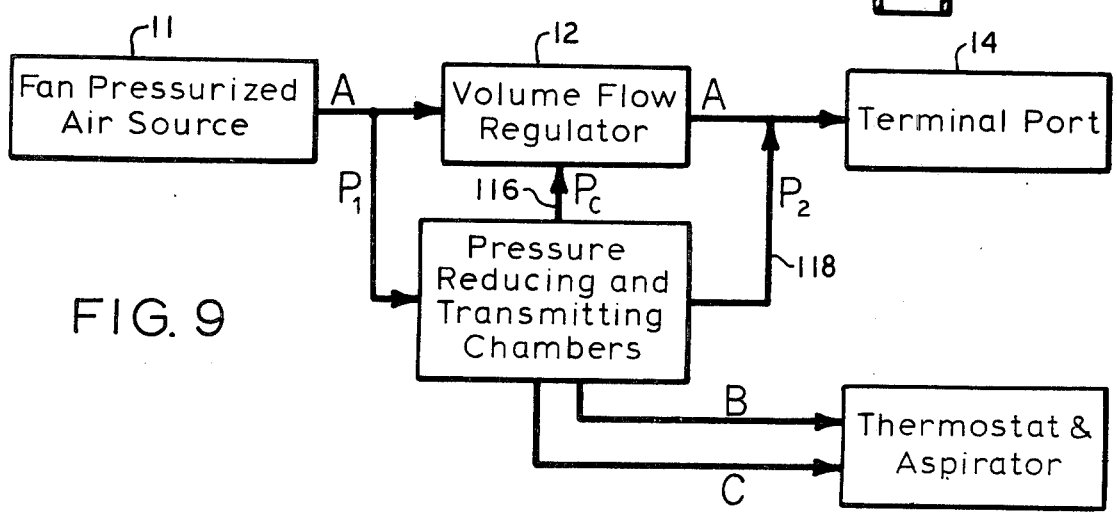
FIG. 9 is a schematic representation of an air distribution system which employs the modular thermostat of the present invention.

As can be seen in FIG. 9, an airflow A, provided by a pressurized air source 11, flows through an air flow regulator 12 to the terminal port diffuser 14 from which it is discharged into the enclosure serviced by the system. In order that the regulator 12 be responsive to changes in ambient temperature, it is adapted to adjust to a pressurized air signal $P_c$ generated by the modular thermostat of the present invention and conveyed to the regulator via conduit 116.

So as to make the regulator 12 and thermostat independent of any external energy source, the unit 110 utilizes as its air supply a portion of the air flow A taken from the system upstream of the regulator 12. This air supply, at a variable pressure $P_1$, enters the unit 110 at the air inlet portion 122. In order to generate a pressure signal indicative of ambient temperature this air supply at pressure $P_1$, which may vary in magnitude through a range of 5:1 or more, must be reduced to a substantially constant pressure air flow. Thus, a portion of the air supply flows through the filter 170. and into the lower section 131 of the pressure reducing chamber 130 which is separated from upper section 132 by the ball 138 resting in the seat 136. Of course, the resulting reduced pressure $P_r$, which will be maintained in the lower section 131 will be dependent upon the weight of the ball 138, the pressure $P_2$ in the upper section 132 and the size of the continuous bleed air restriction 139. The ball 138 is of such a weight that its downward force equals the area of the aperture in seal 136 multiplied by the desired reduced pressure $P_r$, which drives the air flow through the restriction 139 and into the pressure transmitting chamber 140.

As has been noted above, it is sometimes desirable that the pressure signal $P_c$ generated by the thermostat be at least partially referenced to the pressure within the air distribution system downstream of the regulator. Accordingly, the outlet port 134 of upper section 132 communicates with air flow A downstream of regulator 12 via conduit 118. This arrangement insures that the air flow through the pressure reducing chamber 130 will always be from the lower section 131 to the upper section 132, since $P_1$ must always be greater than $P_2$.

Therefore, air at pressure $P_1$ flows into lower section 31 until the pressure is slightly above $P_r + P_2$. At this point the ball 138 will lift from the seat 136 and air will bleed from section 131 to section 132 until the pressure in section 131 is slightly below $P_r + P_2$. At this point the ball 38 will again engage seat 136 and the air flow passageway will be closed. Thus, this arrangement will intermittently bleed lower section 131 so as to provide a substantially constant reduced pessure $P_r$, referenced to $P_2$, for a wide variation in air supply pressure $P_1$.

In this manner, a constant pressure is supplied to the pressure transmitting chamber 140 via restriction nozzle 139. This chamber, in turn, vents to the thermometric chamber 150 via conduit B and the exhaust nozzle 142, and the air discharge from nozzle 142 is regulated by the position of flapper 156 and bimetallic lever 153. Thus, the resulting pressure $P_c$ within the pressure transmitting chamber 140 will be indicative of ambient temperature and the given initial set point made with adjusting rod 160 and set point knob 162. This pressure may be transmitted via outlet port 146 and conduit 116 to the regulator 12.

One principle advantage of this modular embodiment of the present invention is the need for only two air flow conduit lines, A and B, from the air distribution system to the remotely placed thermometric chamber and aspirator. It will be recognized that three such conduits are required when the embodiments shown in FIGS. 1 and 2 are stationed remote from the regulator and air distribution system. Thus, greater ease in installation, maintenance and repair is effected with the modular device. Moreover, separate servicing of the unit 110 or the thermometric chamber 150 and aspirator 160 may be performed. Finally, manufacture of the improved thermostat is simplified through the use of modular components.

Still another embodiment of the present invention is illustrated in FIGS. 10-12. This embodiment is directed toward a modified modular thermostat which assures accurate sensing of ambient temperature within the room or enclosure serviced by the air distribution system.

Due to the high cost of labor incurred in the installation of heating, cooling and ventillating systems, it is preferred to pre-assemble the heat sensing and aspirating component of the modular thermostat with the terminal diffuser of the air distribution system. In this manner both the diffuser and the temperature sensing device may be installed simultaneously thereby reducing labor costs.

Referring now to FIG. 10, a typical assembly is shown with the heat sensing and aspirating component 200 mounted at one end of a terminal diffuser 202. This assembly may be conveniently positioned in the ceiling 204 of the enclosure and is engaged with a discharge duct 206 of the air distribution system.

It has been discovered, however, that when the heat sensing and aspirating component disclosed hereinabove is used in such an assembly, accurate temperature control is difficult to attain. This difficulty is attributed to the fact that conditioned air discharged through diffuser 202 will heat or cool the metal support structure 210. This structure, through conduction and radiation, changes the temperature of the air space 212. For example, cooled air discharged through diffuser 202 may have a temperature as low as 50° F. This cool air may lower the temperature in chamber 212 to about 65° F. which, in turn, may result in a "reading" by the thermosensing apparatus which is lower than the ambient temperature of the room being serviced by the air distribution system.

Accordingly, the improved thermostat of the present invention may include means for aspirating the area adjacent to the thermometric chamber 250 in order to insure that the thermosensing apparatus is not affected be conductive or radiant heat transfer. A preferred mode for performing this "external" aspiration is illustrated in FIGS. 11 and 12 wherein a second aperture 252 is disposed in the bottom of the aspirating tube 262 downstream from the primary aspirating aperture which services the thermometric chamber 250. This arrangement allows the aspirating means 260 to draw ambient air through the air space 212, as indicated by the arrows in FIGS. 12, thereby eliminating the conductive and radiant heat transfer potential which might adversely affect the accuracy of the thermostat.

This dual aspiration embodiment is constructed, installed, and operated in substantially the same manner as is the modular component embodiment described hereinabove. Thus, the aspirating means 260 is provided an air supply via conduit C which communicates with the air distribution system, and the air nozzle (not shown) is provided its air supply via conduit B which communicates with the pressure reducing component of the thermostat. Room air is thereby drawn through both the thermometric chamber 250 and the air space 212 assuring accurate temperature sensing which, in turn, controls the bleed through the thermostat's air nozzle. In this manner an air pressure signal may be generated which is indicative of the true ambient temperature in the enclosure serviced by the air contribution system.

It can be seen from the foregoing, that the improved thermostat of the present invention provides a pressurized air signal indicative of ambient temperature, which signal is generated from a variable pressure air supply and which may be used to activate an air flow regulator within an air distribution system. Moreover, where the regulator so requires, the pressure signal may be referenced at least partially to the pressure downstream from the regulator. Finally, the thermostat utilizes no external source of energy other than that derived from the air flow within the air distribution system, so that each air regulator and its respective thermostat operate as an independent unit.

Of course, it should be understood that the preferred embodiments of the improved pneumatic thermostat, herein disclosed, may be modified without departing from the spirit and scope of the invention and without diminishing its attendant advantages.

I claim:

1. An improved pneumatic thermostat for adjusting a volume flow regulator in conditioned air distribution duct depending on the temperature of ambient air, said thermostat comprising: receiving means for receiving variable pressure air supply; pressure generating means for generating from said air supply a substantially constant-pressure air flow; a pressure chamber having inlet means for receiving said air flow; temperature-responsive means disposed within a thermometric chamber for adjusting the pressure within said pressure chamber in response to changes in ambient temperature; outlet means communicating with said pressure chamber for transmitting a pressure signal, said pressure signal being indicative of said temperature; primary aspirating means for drawing ambient air through the interior of said thermometric chamber; and, secondary aspirating means for drawing ambient air through the space immediately adjacent the exterior of said thermometric chamber so as to maintain the walls of said thermometric chamber at subtantially ambient temperature.

2. The improved pneumatic thermostat of claim 1 wherein said primary aspirating means includes a discharge conduit having a first aperture in communication with the interior of said thermometric chamber and said secondary aspirating means includes said discharge conduit having a second aperture positioned immediately adjacent to the exterior of said thermometric chamber.

3. An improved pneumatic thermostat of claim 1 wherein:
receiving means comprises a receiving conduit;
pressure generating means comprises a compartmented chamber, which in turn, comprises an upper compartment having an outlet opening and a lower compartment having a restricted inlet and a restricted outlet, and a ball closing off the upper compartment from the lower compartment when the force exerted on said ball by the pressure of gases in the lower compartment is less than the sum of the force of gravity acting on said ball and the force of pressure of gases in the upper compartment;
temperature-responsive means comprises a bimetallic member and a flapper cooperatively associated with said bimetallic member so as to regulate the amount of air flow passing from said pressure chamber to said thermometric chamber;
outlet means comprises an outlet conduit; and,
said primary and secondary aspirating means comprises an aspiring conduit having a section of reduced cross-sectional area.

4. An improved pneumatic thermostat of claim 3 wherein said outlet opening communicates with the distribution duct downstream of said flow regulator.

5. In an air flow distribution system including a variable pressure air supply for supplying pressurized air having variable pressure to diffusing means so that said diffusing means diffuses said pressurized air into an enclosed volume and control means for regulating air flow from said variable pressure air supply to said diffusing means in response to an air pressure signal indicative of ambient temperature within the enclosed volume, the improvement comprising an improved pneumatic thermostat for generating from the variable pressure air supply a signal indicative of the temperature of ambient air inside said enclosed volume, said thermostat comprising:
a receiving conduit for receiving variable pressure air supply;
a pressure chamber;
pressure reducing means for generating, from said variable pressure air, substantially constant pressure;
temperature-responsive means for adjusting the pressure in said pressure chamber in response to the ambient temperature in said enclosed volume so that the pressure in said pressure chamber is indicative of the ambient temperature in the enclosed volume;
primary aspirating means inside said receiving conduit for drawing air from the enclosed volume through said temperature-responsive means; and,
secondary aspirating means for drawing air from the enclosed volume around the exterior of said temperature-responsive means so as to maintain the exterior of said temperature-responsive means at temperature close to the ambient temperature in the enclosed volume.

6. An air flow distribution system claimed in claim 5 wherein:
said pressure reducing means comprises: a compartmented chamber having an upper and a lower section and a ball separating the two sections whenever the sum of the force of gravity and the force due to air pressure acting on said ball is more than the total force due to air pressure in the lower section acting upward on said ball, said lower section communicating with said receiving conduit through a restricted inlet and communicating with said pressure chamber through a restricted outlet, said upper section having an outlet opening.

7. An air flow distribution system claimed in claim 6 wherein:
said temperature-responsive means comprises;
a thermometric chamber having an inlet nozzle, an inlet aperture and an outlet aperture, said inlet nozzle providing communication with said pressure chamber, said inlet aperture permitting air from the enclosed volume to pass therethrough into said thermometric chamber, said outlet aperture allowing air drawn by said primary aspirating means to exit from said thermometric chamber into said receiving conduit;

a bimetallic member inside said thermometric chamber; and a flapper cooperatively connected to said bimetallic member so that deflection of the bimetallic member in response to the temperature of air drawn from the enclosed volume into said thermometric chamber causes the flapper to adjust the amount of air flowing into the thermometric chamber through said inlet nozzle so that the pressure inside the pressure chamber depends upon the temperature sensed by the bimetallic member.

8. An air flow distribution system claimed in claim 7 wherein:

said primary and said secondary aspirating means each comprises a venturi.

9. An improved pneumatic thermostat for measuring the ambient temperature of air, which comprises:

an aspirating conduit having a first and a second aperture;

an inlet conduit for receiving and carrying air from a variable pressure air supply into said aspirating conduit, said inlet conduit extending partially into said aspirating conduit, said aspirating conduit having a substantially larger cross section than said inlet conduit;

a compartmented chamber having a lower compartment, an upper compartment, and a passageway connecting said lower and said upper compartment, said lower compartment having a restricted inlet opening for receiving air from a variable pressure air supply and having a restricted outlet opening, said upper compartment having a vent opening;

a pressure chamber communicating with said lower compartment through said restricted outlet opening;

a temperature chamber communicating with said aspirating conduit through said second aperture, said temperature chamber also having an inlet nozzle for communication with the pressure chamber and an inlet bore through which the ambient air is drawn from surroundings into said temperature chamber;

a bimetallic member inside said temperature chamber;

biasing means;

a flapper for regulating discharge from said nozzle, said flapper cooperatively connected to said bimetallic member and to said biasing means biasing said flapper toward the nozzle so that deflection of the bimetallic member in response to the temperature of the ambient air drawn from inlet bore through the temperature chamber past the second aperture by the action of variable pressure air passing through the aspirating conduit causes proportional variance of the distance between the nozzle and the flapper, thus controlling the pressure in the pressure chamber and providing a pressure signal indicative of the temperature of the ambient air; and an enclosure partially enclosing a volume of ambient air around said pressure and temperature chambers, said volume of ambient air communicating with the first aperture so that the ambient air around said temperature and pressure chamber is continuously drawn into the first aperture maintaining the walls of said temperature chamber at substantially ambient temperature.

10. A distribution system as claimed in claim 5 wherein:

pressure reducing means is referenced to the variable pressure downstream from said control means.

11. An improved pneumatic thermostat for adjusting a volume flow regulator in conditioned air distribution duct depending on the temperature of ambient air, said pneumatic thermostat comprising;

receiving means for receiving conditioned air having variable pressure;

constant-pressure generating means, referenced to pressure in said distribution duct downstream from said volume flow regulator, for producing from said conditioned air a substantially constant pressure;

a transmitting chamber communicating through a restriction with said constant pressure;

a thermometric chamber communicating through a restriction nozzle with said constant pressure;

a thermometric chamber communicating with said ambient air, with the receiving means and through a nozzle with the transmitting chamber;

a temperature-responsive means disposed within said thermometric chamber for adjusting the pressure within said transmitting chamber by varying the communication between said transmitting chamber and said thermometric chamber;

primary aspirating means for inducing flow of the ambient air through said thermometric chamber; and, secondary aspirating means for drawing ambient air around said thermometric chamber so as to maintain the walls of said thermometric chamber at the temperature substantially the same as that of the ambient air.

12. An improved thermostat as claimed in claim 11 wherein temperature-responsive means comprises:

a bi-metallic lever;

a flapper for proportionally opening and closing the nozzle, said flapper being cooperatively connected to said bi-metallic lever; and, biasing means tending to maintain said flapper in a position restricting the flow.

13. An improved pneumatic thermostat as claimed in claim 1 wherein:

ambient air drawn by said secondary aspirating means flows along at least a major portion of the exterior of said thermometric chamber.

14. An air distributing system as claimed in claim 5 wherein said thermostat is in the vicinity of said diffusing means.

* * * * *

UNITED STATES PATENT AND TRADEMARK OFFICE
CERTIFICATE OF CORRECTION

PATENT NO. : 4,141,496
DATED : February 27, 1979
INVENTOR(S) : Ernest J. Duchek

It is certified that error appears in the above-identified patent and that said Letters Patent are hereby corrected as shown below:

Column 2, line 45, "suply" should be --supply--;

Column 3, line 6, "pneumatric" should be --pneumatic--;

Column 4, line 51, "portion" should be --port--;

Column 7, line 19, "portion" should be --port--;

Column 7, line 24, after "170" delete "." and insert --,--;

Column 7, line 33, "seal" should be --seat--;

Column 8, line 54, "be" should be --by--;

Column 9, line 11, "contribution" should be --distribution--.

Signed and Sealed this

Ninth Day of October 1979

[SEAL]

Attest:

RUTH C. MASON
Attesting Officer

LUTRELLE F. PARKER
Acting Commissioner of Patents and Trademarks